UNITED STATES PATENT OFFICE.

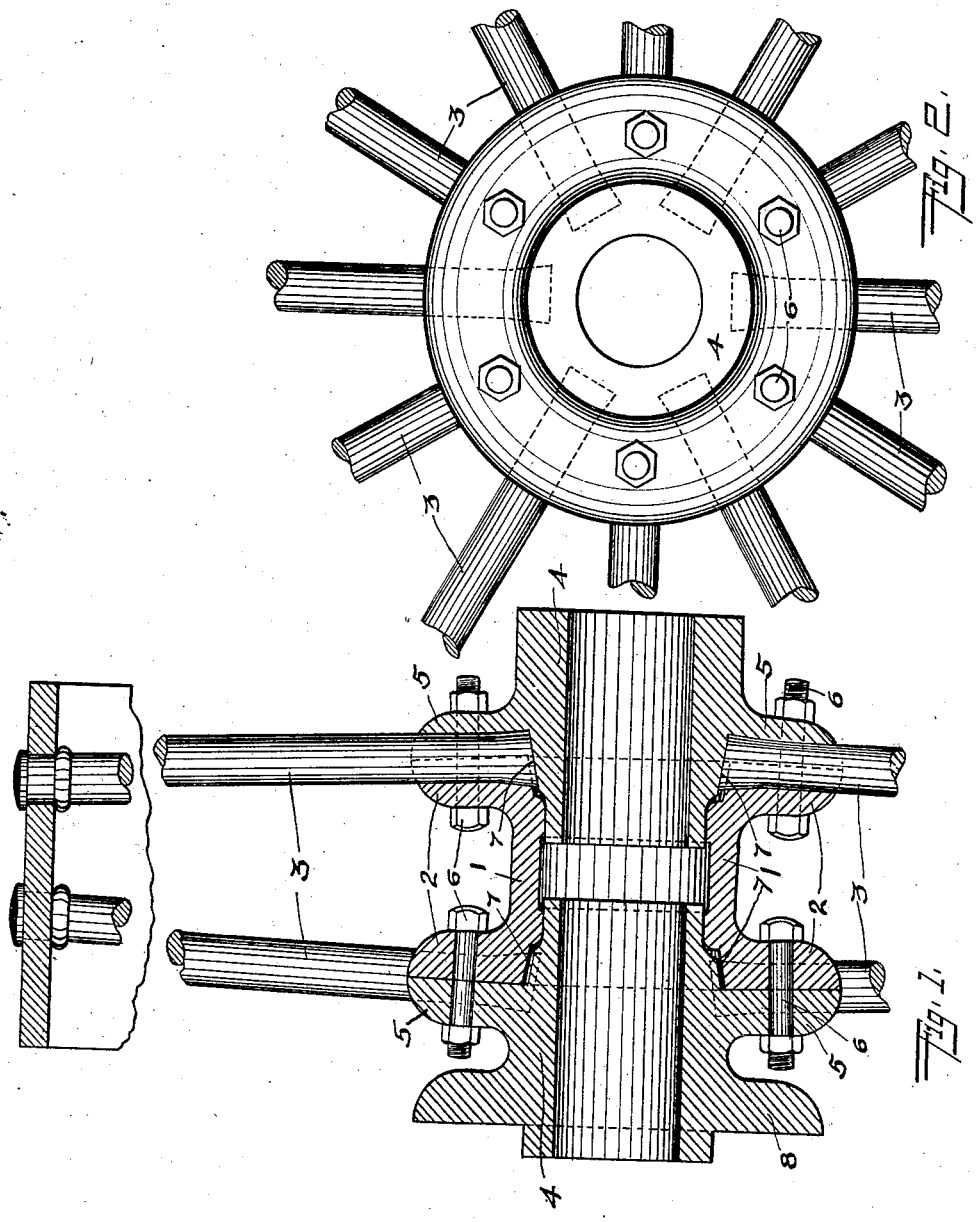

PETER REINHARDT, OF OMAHA, NEBRASKA.

METALLIC VEHICLE-HUB.

No. 884,612.  Specification of Letters Patent.  Patented April 14, 1908.

Application filed June 10, 1907. Serial No. 378,292.

*To all whom it may concern:*

Be it known that I, PETER REINHARDT, a citizen of the United States, and a resident of Omaha, in the county of Douglas and State of Nebraska, have invented certain new and useful Improvements in Metallic Vehicle-Hubs, of which the following is a specification.

My invention relates to metallic vehicle-wheels, more particularly to the hubs of wheels of this class, and it is the object thereof to provide a strong, simple and inexpensive metallic wheel for use on traction engines, grading machinery, agricultural implements and the like, and in which any worn or broken parts may be readily removed and replaced by new parts without disassembling the entire wheel.

A construction embodying my invention is illustrated in the accompanying drawings in which—

Figure 1 is an axial section of the wheel hub, and Fig. 2 is a side elevation of the same.

In the construction shown I provide an annular body 1 which is provided at the ends thereof with flanges 2, in the outer faces of which are radially-extending semicircular recesses adapted to receive the ends of the spokes 3. The said spokes are in two sets, the outer ends of which incline toward a common plane, and the spokes of each set alternate in radial position with the spokes of the other set.

The hub box is formed by two sleeves 4, each of which is provided with flanges 5 similar to the flanges 2 on the annular body 1, said flanges 5 being recessed on the inner faces thereof to receive the spokes 3 and being secured to the said flanges 2 by bolts 6 spaced between the spokes as shown in Fig. 2. A portion of each of the sleeves 4 extends as a nipple inside the annular body 1 and, adjoining the ends of the spokes, said nipples are provided with conical surfaces 7 which engage the ends of the spokes to force the same outwardly and cause them to be wedged tightly between the hub and the tire of the wheel. The connection between spokes and hub is thus adapted to withstand compressive stresses. The inner ends of the spokes are slightly upset or expanded, as shown, the expanded portion preventing the same from being pulled out of the hub by tensile stresses thereon. One of the sleeves 4 may be provided with a flange 8 suitable for the attachment thereto of a gear or sprocket where the wheel is to be used as the driving wheel for earth-moving machines or the like.

By reference to the drawings it will be obvious that any portion of the wheel which is worn or broken may be readily replaced without entirely disassembling the wheel. Thus, either of the sleeves 4 may be removed by taking out the bolts 6 connecting the flange thereof with the corresponding flange of the annular body 1; the annular body 1 may be removed by taking off the sleeves 4 and one or two of one set of the spokes; and any of the spokes may be removed by taking off the sleeve whose flange retains the same and then disconnecting the outer ends thereof from the tire of the wheel.

Now, having described my invention, what I claim and desire to secure by Letters Patent is:

1. A metallic hub for vehicle wheels, comprising axially-alined sleeves forming the hub box, an annular body inclosing the adjoining ends of the sleeves, flanges on the ends of the annular body and on the sleeves, said flanges having radially-extending recesses formed in the adjoining faces thereof to receive the inner ends of the wheel spokes, and bolts for removably connecting the sleeve-flanges and the flanges of the annular body.

2. A metallic hub for vehicle wheels, comprising two axially-alined sleeves forming the hub box, an annular body inclosing the adjoining ends of the sleeves, flanges on the ends of the annular body and on the sleeves, said flanges having radially-extending recesses in the adjoining faces thereof to receive the inner ends of the wheel spokes, the ends of said spokes being upset or expanded, there being conical surfaces on the sleeves adapted to engage the ends of the spokes, and bolts for removably connecting the sleeve-flanges with the flanges of the annular body.

In testimony whereof I have hereunto subscribed my name in the presence of two witnesses.

PETER REINHARDT.

Witnesses:
J. A. BARRETT,
W. H. GATES.